US012323050B2

United States Patent
Fukuda

(10) Patent No.: US 12,323,050 B2
(45) Date of Patent: Jun. 3, 2025

(54) POWER CONVERSION APPARATUS, VEHICLE AUXILIARY POWER SUPPLY, AND METHOD FOR STOPPING POWER CONVERSION APPARATUS

(71) Applicant: Mitsubishi Electric Corporation, Tokyo (JP)

(72) Inventor: Yoichi Fukuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 18/040,271

(22) PCT Filed: Sep. 11, 2020

(86) PCT No.: PCT/JP2020/034527
§ 371 (c)(1),
(2) Date: Feb. 2, 2023

(87) PCT Pub. No.: WO2022/054243
PCT Pub. Date: Mar. 17, 2022

(65) Prior Publication Data
US 2023/0275527 A1 Aug. 31, 2023

(51) Int. Cl.
*H02M 1/32* (2007.01)
*H02M 1/36* (2007.01)
*H02M 7/537* (2006.01)

(52) U.S. Cl.
CPC ............... *H02M 1/32* (2013.01); *H02M 1/36* (2013.01); *H02M 7/537* (2013.01)

(58) Field of Classification Search
CPC ........ H02M 7/497; H02M 7/53; H02M 7/537; H02M 7/5387; H02M 7/48; H02M 7/539
See application file for complete search history.

(56) References Cited

U.S. PATENT DOCUMENTS

| 2013/0314013 A1 | 11/2013 | Ajima et al. | |
| 2016/0094180 A1* | 3/2016 | Ajima | B62D 5/065 |
| | | | 318/504 |

(Continued)

FOREIGN PATENT DOCUMENTS

| JP | 2011211777 A | 10/2011 |
| JP | 2013-247754 A | 12/2013 |
| JP | 2017-103902 A | 6/2017 |

OTHER PUBLICATIONS

International Search Report (PCT/ISA/210) with translation and Written Opinion (PCT/ISA/237) mailed on Nov. 24, 2020, by the Japan Patent Office as the International Searching Authority for International Application No. PCT/JP2020/034527. (8 pages).

(Continued)

*Primary Examiner* — Alex Torres-Rivera
(74) *Attorney, Agent, or Firm* — BUCHANAN, INGERSOLL & ROONEY PC

(57) ABSTRACT

A power conversion apparatus includes: a three-phase inverter that supplies alternating-current power obtained by conversion to a load via a filter circuit including a three-phase reactor circuit and a three-phase capacitor circuit; a voltage detector that detects three-phase voltages that are voltages at respective connection points between the three-phase reactor circuit and the three-phase capacitor circuit; and a control device that controls operation of the three-phase inverter on the basis of the three-phase voltages detected by the voltage detector. The control device includes a calculation unit that calculates a zero-phase voltage obtained by adding together the three-phase voltages, a separation unit that separates an instantaneous value of the zero-phase voltage into an alternating-current signal and a direct-current signal, and a first determination unit that (Continued)

determines whether a ground fault occurs on the basis of an effective value of the alternating-current signal.

14 Claims, 8 Drawing Sheets

(56) References Cited

U.S. PATENT DOCUMENTS

2018/0045767 A1* 2/2018 Daigle .................. G01R 35/00
2019/0312425 A1* 10/2019 Xiao ........................ H02H 7/12

OTHER PUBLICATIONS

Office Action dated Feb. 11, 2025, issued in the corresponding Indian Patent Application No. 202327008178, 6 pages.

* cited by examiner

POWER CONVERSION APPARATUS, VEHICLE AUXILIARY POWER SUPPLY, AND METHOD FOR STOPPING POWER CONVERSION APPARATUS

FIELD

The present invention relates to a power conversion apparatus that converts input power into alternating-current power and supplies the alternating-current power to a load, to a vehicle auxiliary power supply including the power conversion apparatus, and to a method for stopping the power conversion apparatus.

BACKGROUND

Patent Literature 1 described below discloses a vehicle auxiliary power supply configured to convert high-voltage direct-current power input from a pantograph into alternating-current power by a three-phase inverter, supply the alternating-current power output from the three-phase inverter to a transformer via an alternating-current reactor, and convert the alternating-current power into desired low-voltage alternating-current power by the transformer.

The vehicle auxiliary power supply supplies power to an auxiliary load. The auxiliary load refers to a load other than a main motor among the loads mounted on a railroad vehicle. Examples of the auxiliary load include a vehicle interior lighting device, a door opening and closing device, an air conditioner, a safety device, a compressor, a battery, and a control power supply. The compressor is a device that generates air source for a vehicle brake.

A typical vehicle auxiliary power supply includes an overcurrent detector. The overcurrent detector detects overcurrent flowing in an auxiliary load circuit. The auxiliary load circuit is an electrical circuit for supplying power to an auxiliary load from a three-phase inverter. When the overcurrent detector detects overcurrent, the vehicle auxiliary power supply performs a protection operation of stopping operation of the three-phase inverter.

CITATION LIST

Patent Literature

Patent Literature 1: Japanese Patent Application Laid-open No. 2011-211777

SUMMARY

Technical Problem

Because the auxiliary load is mounted on a railroad vehicle, insulation deterioration of the auxiliary load develops earlier than that of home appliances or the like. If the insulation deterioration develops, the current flowing in the auxiliary load circuit becomes larger than that in the case when the insulation deterioration has not occurred. Here, the current flowing in the auxiliary load circuit when the insulation deterioration occurs is referred to as "ground fault current". The ground fault current is smaller than the overcurrent described above. Thus, the ground fault current rarely reaches a determination value for overcurrent protection; therefore, the insulation deterioration of the auxiliary load circuit is difficult to detect with high accuracy. Although it is possible to lower the determination value for overcurrent protection, the number of false positives in overcurrent protection increases, which is a practical problem.

The present invention has been achieved in view of the above and an object of the present invention is to provide a power conversion apparatus capable of detecting insulation deterioration of an auxiliary load circuit early with high accuracy.

Solution to Problem

In order to solve the above problems and achieve the object, a power conversion apparatus according to the present invention includes a three-phase inverter to convert input power to alternating-current power and supply the alternating-current power obtained by conversion to a load via a filter circuit comprising a three-phase reactor circuit and a three-phase capacitor circuit. The power conversion apparatus further includes a voltage detector to detect three-phase voltages that are voltages at respective connection points between the three-phase reactor circuit and the three-phase capacitor circuit, and a control device to control operation of the three-phase inverter on a basis of the three-phase voltages detected by the voltage detector. The control device includes a calculation unit to calculate a zero-phase voltage obtained by adding together the three-phase voltages, a separation unit to separate an instantaneous value of the zero-phase voltage into an alternating-current signal and a direct-current signal, and a first determination unit to determine whether a ground fault occurs on a basis of an effective value of the alternating-current signal.

Advantageous Effects of Invention

According to the present invention, an effect is obtained where insulation deterioration of an auxiliary load circuit can be detected early with high accuracy.

DESCRIPTION OF EMBODIMENTS

A power conversion apparatus, a vehicle auxiliary power supply, and a method for stopping the power conversion apparatus according to embodiments of the present invention will be described below in detail with reference to the accompanying drawings. Note that the embodiments described below are not intended to limit the present invention. Moreover, the embodiments below will be described in terms of a power conversion apparatus mounted on a railroad vehicle as an example; however, this is not intended to exclude applications to other uses. Moreover, in the following descriptions, electrical connection and physical connection are not distinguished from each other and are simply referred to as "connection".

Embodiment

Figure 1:
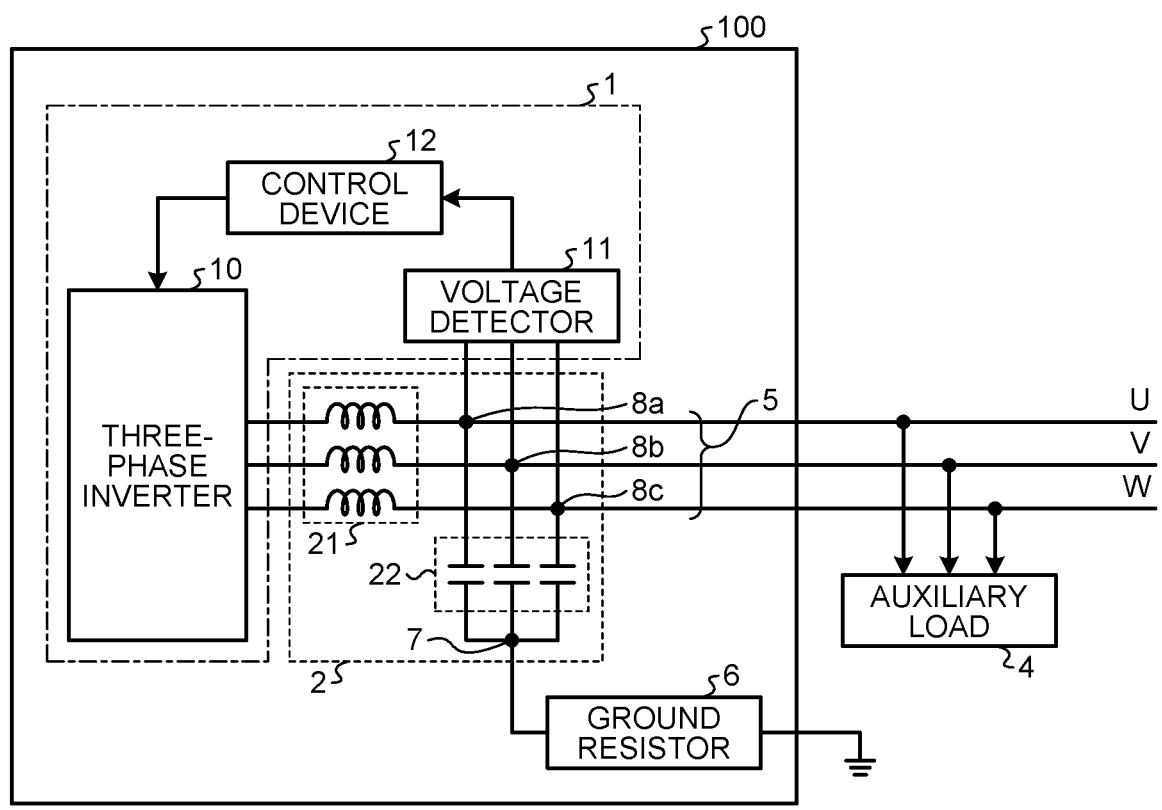
FIG. 1 is a diagram illustrating an exemplary configuration of a vehicle auxiliary power supply according to an embodiment.

FIG. 1 is a diagram illustrating an exemplary configuration of a vehicle auxiliary power supply 100 according to an embodiment. As illustrated in FIG. 1, the vehicle auxiliary power supply 100 according to the present embodiment includes a power conversion apparatus 1 and a filter circuit 2. The power conversion apparatus 1 includes a three-phase inverter 10, a voltage detector 11, and a control device 12. The three-phase inverter 10 and an auxiliary load 4 are connected with each other by three electrical wires 5 with the filter circuit 2 therebetween. The three electrical wires 5 are U-phase, V-phase, and W-phase electrical wires.

The filter circuit 2 includes a three-phase reactor circuit 21 and a three-phase capacitor circuit 22. The three-phase reactor circuit 21 includes three reactor elements. The three-phase capacitor circuit 22 includes three capacitor elements. Each of the three reactor elements of the three-phase reactor circuit 21 is inserted into the corresponding U-phase, V-phase, or W-phase electrical wire 5. One end of each of the three reactor elements is connected to the three-phase inverter 10. The other end of each of the three reactor elements is connected to one end of a corresponding one of the capacitor elements of the three-phase capacitor circuit 22 at a connection point 8a, 8b, or 8c on the electrical wire 5. The other ends of the three capacitor elements are connected with each other at one point. This connection is referred to as Y-connection. A connection point 7 that is a connection point in the Y-connection configuration is grounded via a ground resistor 6. The three-phase reactor circuit 21 and the three-phase capacitor circuit 22 constitute an LC filter circuit.

As described above, examples of the auxiliary load 4 include a vehicle interior lighting device, a door opening and closing device, an air conditioner, a safety device, a compressor, a battery, and a control power supply. Of the examples of the auxiliary load 4, a vehicle interior lighting device, a door opening and closing device, an air conditioner, a safety device, and a compressor are alternating-current (AC) loads that operate upon receiving supply of AC power. A battery and a control power supply are direct-current (DC) loads that operate upon receiving supply of DC power.

As illustrated in FIG. 1, the voltage detector 11 detects three-phase voltages appearing at the connection points 8a, 8b, and 8c. In other words, the three-phase voltages are voltages at respective connection points between the three-phase reactor circuit 21 and the three-phase capacitor circuit 22. The result of detection by the voltage detector 11 is input to the control device 12. The control device 12 controls operation of the three-phase inverter 10 on the basis of the three-phase voltages detected by the voltage detector 11.

In FIG. 1, the voltage detector 11 detects the voltages at the connection points 8a, 8b, and 8c between the three-phase reactor circuit 21 and the three-phase capacitor circuit 22; however, the present embodiment is not limited thereto. Voltage may be detected at points displaced toward the three-phase reactor circuit 21 or toward the auxiliary load 4 from the connection points 8a, 8b, and 8c in FIG. 1. In other words, the voltage detector 11 may detect voltage at any position that is regarded as having the same potential as the potential at each connection point.

The three-phase inverter 10 converts input power into AC power and supplies the AC power obtained by the conversion to the auxiliary load 4 via the filter circuit 2 under the control of the control device 12. The filter circuit 2 reduces harmonics contained in the output voltage of the three-phase inverter 10. Thus, AC voltage having a more sinusoidal shape than that when there is no filter circuit 2 is applied to the auxiliary load 4.

Figure 2:
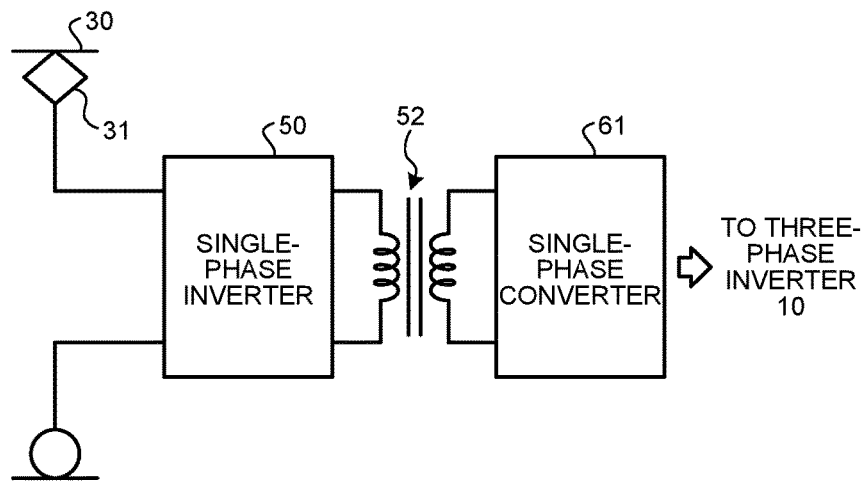
FIG. 2 is a diagram illustrating a first exemplary configuration of a power supply that generates input power for the three-phase inverter illustrated in FIG. 1.

FIG. 2 is a diagram illustrating a first exemplary configuration of a power supply that generates input power for the three-phase inverter 10 illustrated in FIG. 1. In the first exemplary configuration illustrated in FIG. 2, DC power supplied from a DC overhead line 30 is received via a current collector 31. The DC power received is converted into AC power by a single-phase inverter 50. The AC power obtained by the conversion is stepped down by a transformer 52 and is then supplied to a single-phase converter 61. The AC power stepped down is converted into DC power by the single-phase converter 61 and is then supplied to the three-phase inverter 10.

Figure 3:
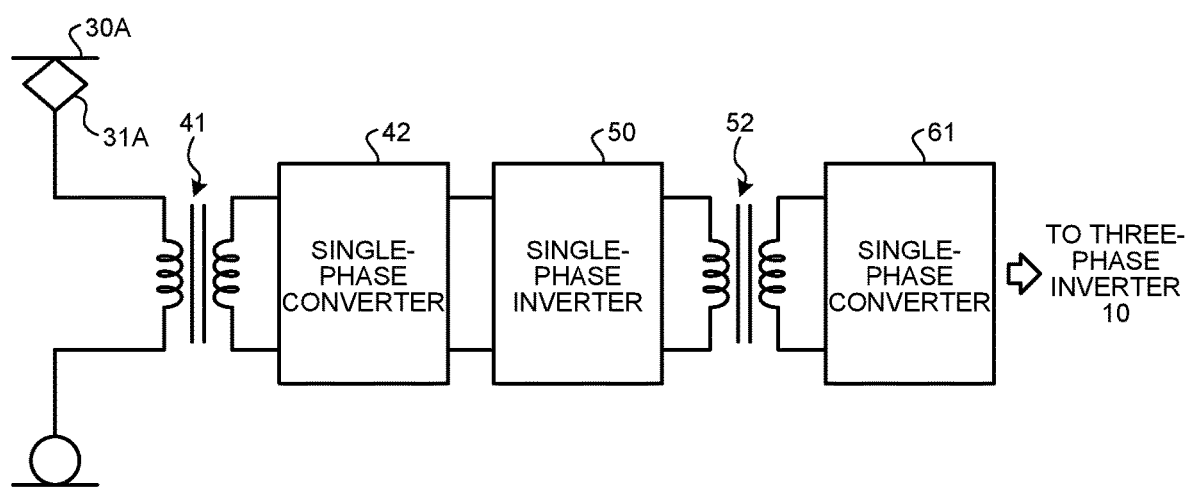
FIG. 3 is a diagram illustrating a second exemplary configuration of the power supply that generates input power for the three-phase inverter illustrated in FIG. 1.

FIG. 3 is a diagram illustrating a second exemplary configuration of the power supply that generates input power for the three-phase inverter 10 illustrated in FIG. 1. In the second exemplary configuration illustrated in FIG. 3, the DC overhead line 30 is replaced by an AC overhead line 30A and the current collector 31 for DC overhead line is replaced by a current collector 31A for AC overhead line. Moreover, comparing the configuration illustrated in FIG. 3 with the configuration illustrated in FIG. 2, a transformer 41 and a single-phase converter 42 are arranged in this order between the current collector 31A and the single-phase inverter 50 in FIG. 3. The AC power supplied from the AC overhead line 30A is received by the transformer 41 via the current collector 31A. The AC power received is stepped down by the transformer 41 and is then supplied to the single-phase converter 42. The AC power stepped down is converted into DC power by the single-phase converter 42 and is then supplied to the single-phase inverter 50. The subsequent operations are the same as those in FIG. 2. Although the single-phase inverter 50, the transformer 52, and the single-phase converter 61 that are common components are each denoted by the same reference numeral in FIG. 2 and FIG. 3, it is needless to say that the capacity or a system of each component is different depending on the difference in overhead line voltage.

Figure 4:
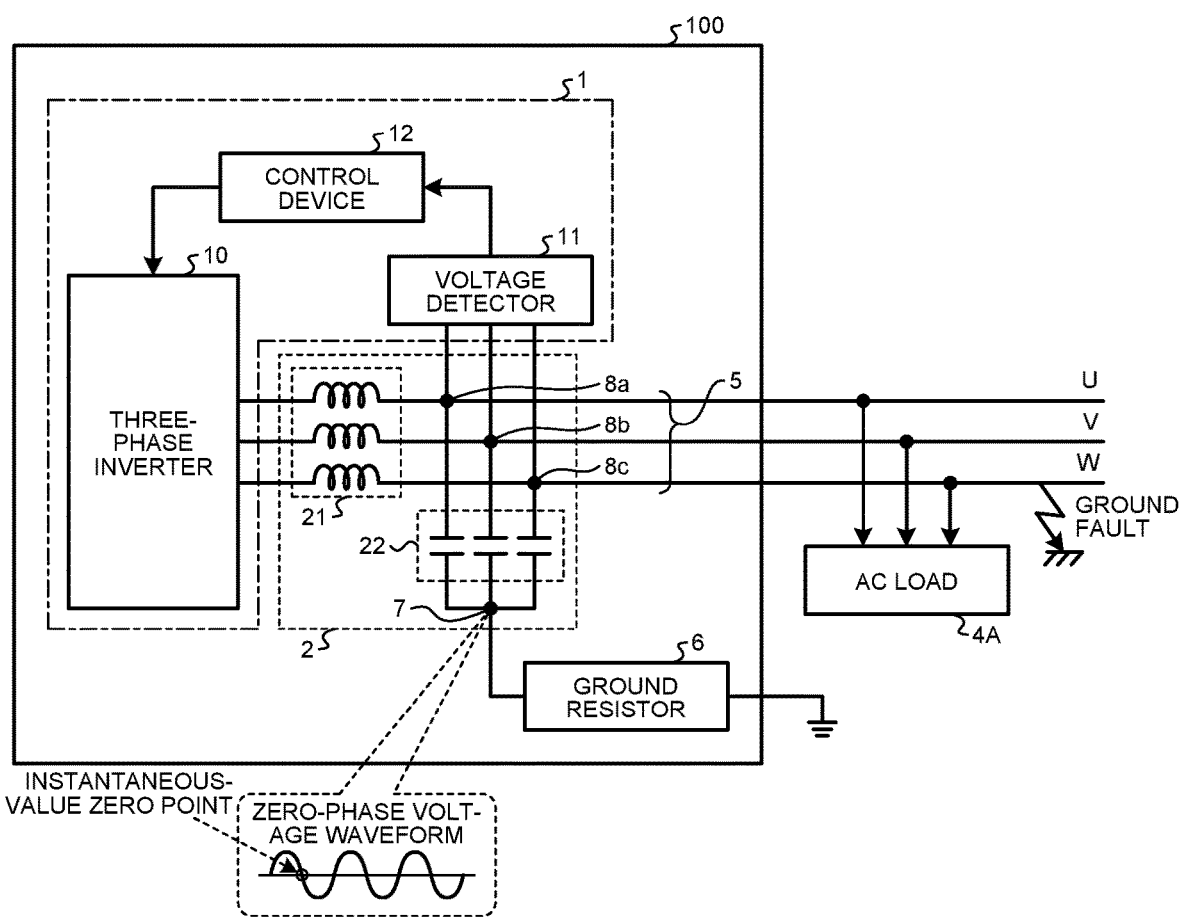
FIG. 4 is a first diagram used for explaining the principle of ground fault detection according to the present embodiment.
Figure 5:
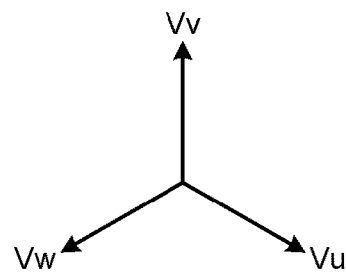
FIG. 5 is a second diagram used for explaining the principle of ground fault detection according to the present embodiment.

FIG. 4 is a first diagram used for explaining the principle of ground fault detection according to the present embodiment. FIG. 5 is a second diagram used for explaining the principle of ground fault detection according to the present embodiment. FIG. 4 is an example of a case where the auxiliary load 4 connected to the vehicle auxiliary power supply 100 in FIG. 1 is an AC load 4A. In FIG. 4, an example is illustrated where insulation of a W-phase electrical wire deteriorates and a W-phase ground fault has occurred. In FIG. 5, the phase relation between three-phase voltages Vu, Vv, and Vw output from the three-phase inverter 10 is represented by vectors. In this specification, a ground fault that occurs when the auxiliary load 4 is the AC load 4A is referred to as "AC ground fault".

When there is no ground fault, as illustrated in FIG. 5, the three-phase voltages Vu, Vv, and Vw have such a phase relation that they are 120° out of phase with each other. When the three-phase voltages have such a phase relation that they are 120° out of phase with each other, the sum of the three-phase voltages Vu, Vv, and Vw indicating a zero-phase voltage, or zero-sequence voltage, is zero. That is, there is a relation Vu+Vv+Vw=0.

The connection point 7 is a point of interconnection and thus has a common potential. Thus, the three-phase voltages Vu, Vv, and Vw are applied to the respective capacitors of the three-phase capacitor circuit 22. This means that when there is no ground fault, a zero-phase voltage does not appear at the connection point 7. In contrast, when an AC ground fault has occurred, the value of the zero-phase voltage Vu+Vv+Vw does not become zero and the zero-phase voltage that changes with a period of three-phase voltage as illustrated in a broken-line frame in FIG. 4 appears at the connection point 7.

Figure 6:
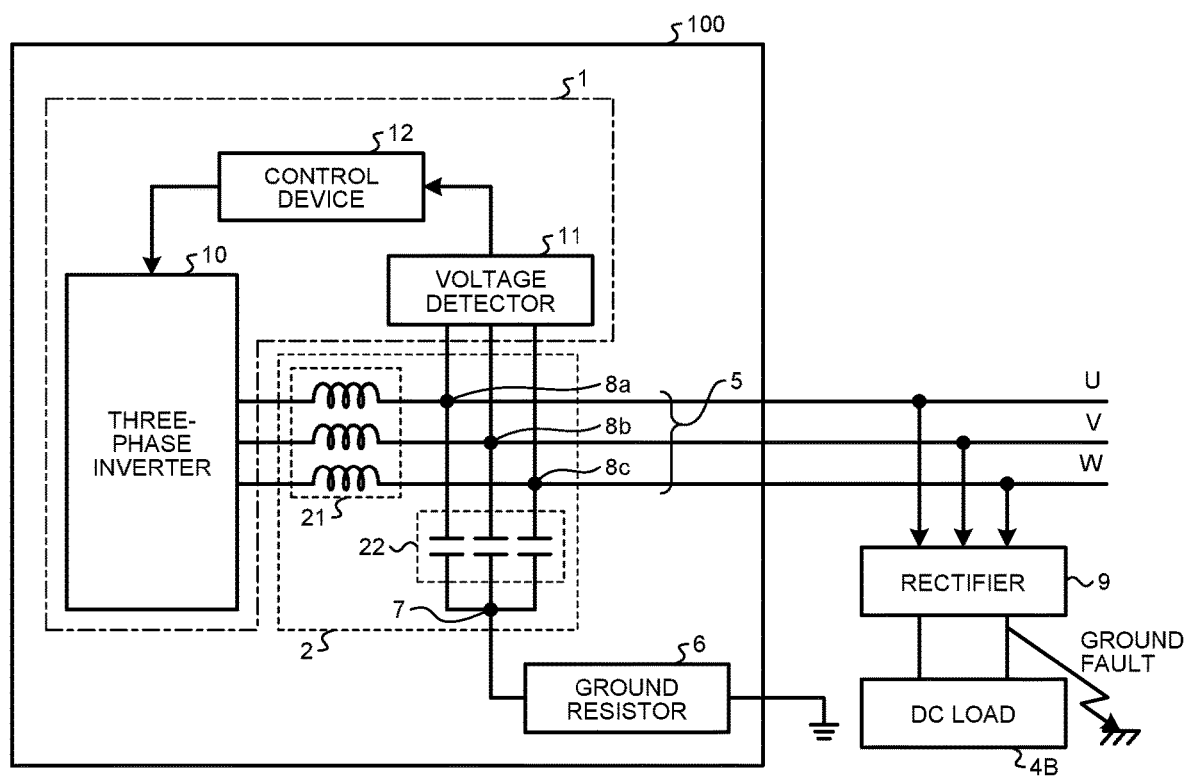
FIG. 6 is a third diagram used for explaining the principle of ground fault detection according to the present embodiment.

FIG. 6 is a third diagram used for explaining the principle of ground fault detection according to the present embodiment. FIG. 6 is an example of a case where the auxiliary load 4 connected to the vehicle auxiliary power supply 100 in FIG. 1 is a DC load 4B. The DC load 4B is connected to the electrical wires 5 via a rectifier 9. In FIG. 6, an example is illustrated where insulation of the electrical wires provided between the rectifier 9 and the DC load 4B deteriorates and a ground fault has occurred in one of the electrical wires. In this specification, a ground fault that occurs when the auxiliary load 4 is the DC load 4B is referred to as "DC ground fault". In the case of the DC ground fault as well, voltage appears at the connection point 7 in a similar manner to the case of the AC ground fault. Note that, voltage that appears in the case of the DC ground fault is DC voltage.

Figure 7:
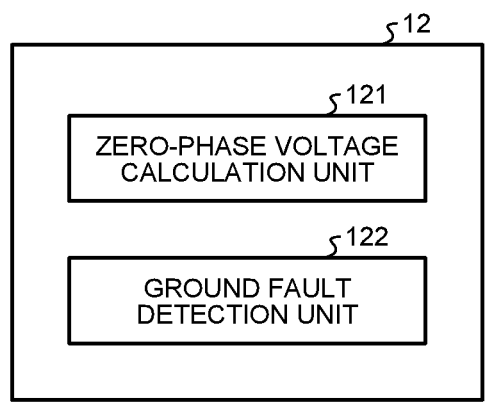
FIG. 7 is a diagram illustrating an exemplary configuration of a control device according to the present embodiment.
Figure 8:
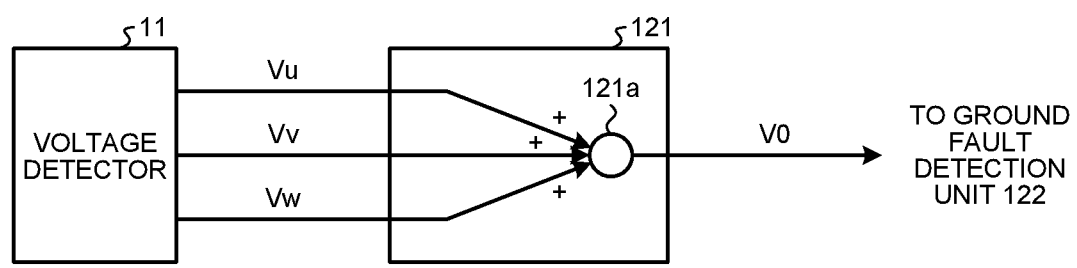
FIG. 8 is a diagram illustrating an exemplary configuration of a zero-phase voltage calculation unit illustrated in FIG. 7.

Next, a description will be given of configuration and operation of the control device 12 according to the present embodiment. FIG. 7 is a diagram illustrating an exemplary configuration of the control device 12 according to the present embodiment. As illustrated in FIG. 7, the control device 12 in the present embodiment includes a zero-phase voltage calculation unit 121 and a ground fault detection unit 122. FIG. 8 is a diagram illustrating an exemplary configuration of the zero-phase voltage calculation unit 121 illustrated in FIG. 7. As illustrated in FIG. 8, the zero-phase voltage calculation unit 121 includes an adder 121a. In the following descriptions, the zero-phase voltage calculation unit 121 is in some cases simply referred to as "calculation unit".

The three-phase voltages Vu, Vv, and Vw detected by the voltage detector 11 are input to the zero-phase voltage calculation unit 121. The adder 121a adds together the three-phase voltages Vu, Vv, and Vw to calculate a zero-phase voltage V0. The zero-phase voltage V0 calculated is output to the ground fault detection unit 122.

Figure 9:
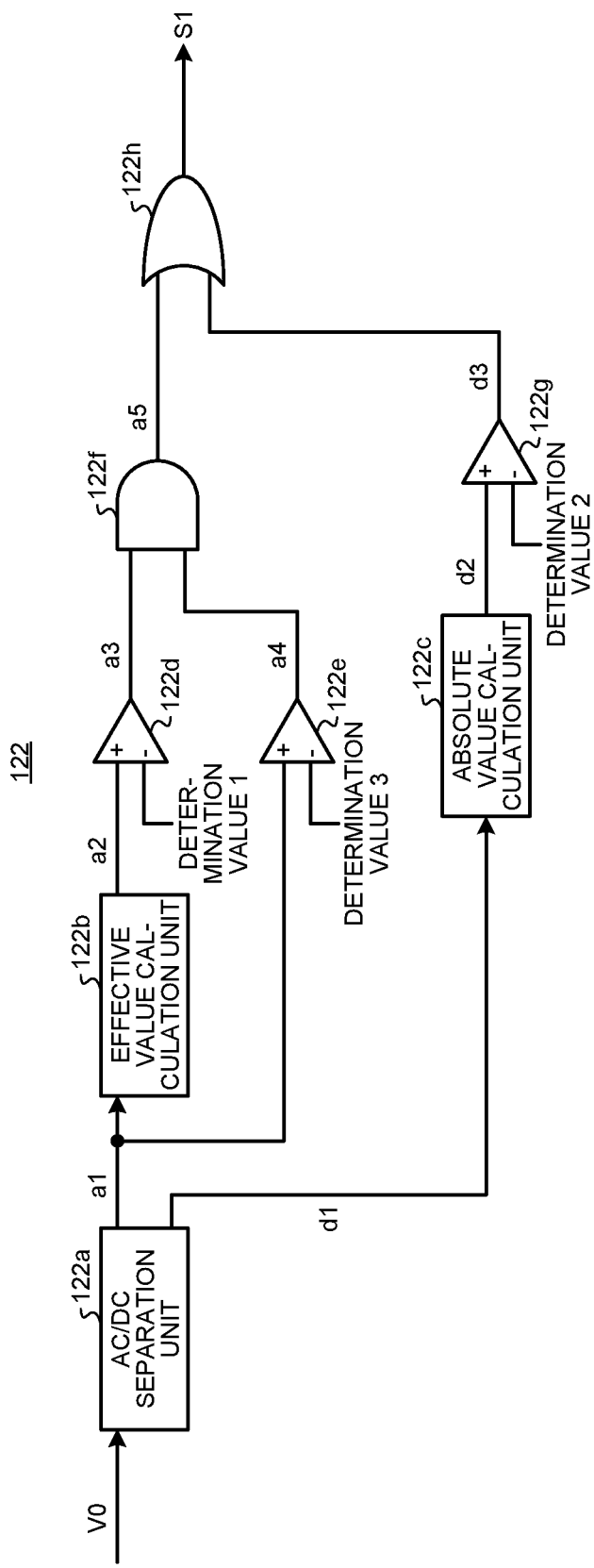
FIG. 9 is a diagram illustrating an exemplary configuration of a ground fault detection unit illustrated in FIG. 7.

FIG. 9 is a diagram illustrating an exemplary configuration of the ground fault detection unit 122 illustrated in FIG. 7. As illustrated in FIG. 9, the ground fault detection unit 122 includes an AC/DC separation unit 122a, an effective value calculation unit 122b, an absolute value calculation unit 122c, comparators 122d, 122e, and 122g, an AND operation unit 122f, and an OR operation unit 122h. In the following descriptions, the AC/DC separation unit 122a is in some cases simply referred to as "separation unit".

The zero-phase voltage V0 calculated by the zero-phase voltage calculation unit 121 is input to the AC/DC separation unit 122a. The AC/DC separation unit 122a separates the instantaneous value of the zero-phase voltage V0 into an AC component and a DC component. The AC component of the signal separated by the AC/DC separation unit 122a is referred to as AC signal and is denoted by "a1". The DC component of the signal separated by the AC/DC separation unit 122a is referred to as DC signal and is denoted by "d1". The AC signal a1 can be generated by a high-pass filtering process, a band-pass filtering process, or the like. The DC signal d1 can be generated by a low-pass pass filtering process or the like. The AC signal a1 is input to the effective value calculation unit 122b and the comparator 122e. The DC signal d1 is input to the absolute value calculation unit 122c.

The effective value calculation unit 122b calculates an effective value a2 of the AC signal a1. The effective value a2 calculated is input to the comparator 122d. The comparator 122d compares the effective value a2 with a determination value 1, and outputs a comparison result a3 thereof. The comparison result a3 is a logical value. When the effective value a2 is larger than the determination value 1, logic "1" is output. When the effective value a2 is smaller than or equal to the determination value 1, logic "0" is output.

In the present embodiment, the effective value calculation unit 122b and the comparator 122d constitute a first determination unit. With the function described above, the first determination unit can determine whether an AC ground fault that may occur on the power supply path to the AC load 4A has occurred.

The absolute value calculation unit 122c calculates an absolute value d2 of the DC signal d1. The absolute value d2 is input to the comparator 122g. The comparator 122g compares the absolute value d2 with a determination value 2, and outputs a comparison result d3 thereof. The comparison result d3 is a logical value. When the absolute value d2 is larger than the determination value 2, logic "1" is output. When the absolute value d2 is smaller than or equal to the determination value 2, logic "0" is output.

In the present embodiment, the absolute value calculation unit 122c and the comparator 122g constitute a second determination unit. With the function described above, the second determination unit can determine whether a DC ground fault that may occur on the power supply path to the DC load 4B has occurred.

The comparator 122e compares the AC signal a1 with a determination value 3, and outputs a comparison result a4 thereof. The comparison result a4 is a logical value. When the AC signal a1 is larger than the determination value 3, logic "1" is output. When the AC signal a1 is smaller than or equal to the determination value 3, logic "0" is output. The determination value 3 is a determination value for detecting an instantaneous-value zero point illustrated in FIG. 4.

The comparison result a3 from the comparator 122d and the comparison result a4 from the comparator 122e are input to the AND operation unit 122f. The AND operation unit 122f performs an AND operation on the comparison results a3 and a4. When both the comparison results a3 and a4 are logic "1", logic "1" is output. In contrast, when at least one of the comparison results a3 and a4 is logic "0", logic "0" is output.

A calculation result a5 from the AND operation unit 122f and the comparison result d3 from the comparator 122g are input to the OR operation unit 122h. The OR operation unit 122h performs an OR operation S1 on the calculation result a5 and the comparison result d3. When at least one of the calculation result a5 and the comparison result d3 is logic "1", logic "1" is output. In contrast, when both the calculation result a5 and the comparison result d3 are logic "0", logic "0" is output.

In the present embodiment, the comparator 122e and the AND operation unit 122f constitute a zero-point detection unit. The zero-point detection unit can detect a zero point of the zero-phase voltage in the AC ground fault on the basis of the instantaneous value of the zero-phase voltage. With the function of the zero-point detection unit and the function of the first determination unit, when the first determination unit determines that a ground fault has occurred, the control device 12 can stop the operation of the three-phase inverter 10 at the timing when a zero point is detected by the zero-point detection unit.

Next, a description will be given of a mode of control by the control device 12 according to the first embodiment. First, the control device 12 monitors the zero-phase voltage calculated by using three-phase voltages that are voltages at the respective connection points between the three-phase reactor circuit 21 and the three-phase capacitor circuit 22. In the auxiliary load circuit, when an AC ground fault occurs, the zero-phase voltage is generated. With the use of this principle, the control device 12 performs a threshold-based determination on the effective value of the AC component of the zero-phase voltage, and determines that an AC ground fault has occurred when the effective value is larger than the threshold value.

The auxiliary load 4 connected to the vehicle auxiliary power supply 100 is generally an AC load but may be a DC load. As a method for determining the occurrence of a DC ground fault, it is possible to use a control circuit for determining the occurrence of an AC ground fault. This method however has trouble with accuracy of the determination. Thus, a control circuit for determining the occurrence of a DC ground fault is separately provided. In the auxiliary load circuit including a DC load, when a DC ground fault has occurred, the zero-phase voltage is generated in a similar manner to the case of an AC ground fault. The control device 12 performs a threshold-based determination on the absolute value of the DC component of the zero-phase voltage, and determines that a DC ground fault has occurred when the absolute value is larger than the threshold value.

When an AC ground fault or a DC ground fault has occurred, the control device 12 stops the operation of the vehicle auxiliary power supply 100 and stops supplying power to the auxiliary load 4. In this case, the voltage in the case of three-phase imbalance may remain in the three-phase capacitor circuit 22 as a residual voltage depending on the timing of stopping the operation of the vehicle auxiliary power supply 100. The residual voltage may adversely affect the operation of the auxiliary load 4 when the vehicle auxiliary power supply 100 is restarted. Thus, the timing of stopping the operation of the vehicle auxiliary power supply 100 is controlled such that the residual voltage is as close to zero as possible. Specifically, as described above, the control device 12 stops the operation of the three-phase inverter 10 at the timing when a zero point of the zero-phase voltage is detected. With this control, the residual voltage of the three-phase capacitor circuit 22 is in the same state as that in the case of three-phase equilibrium; therefore, the residual voltage can be controlled such that it has a value close to zero.

Figure 10:
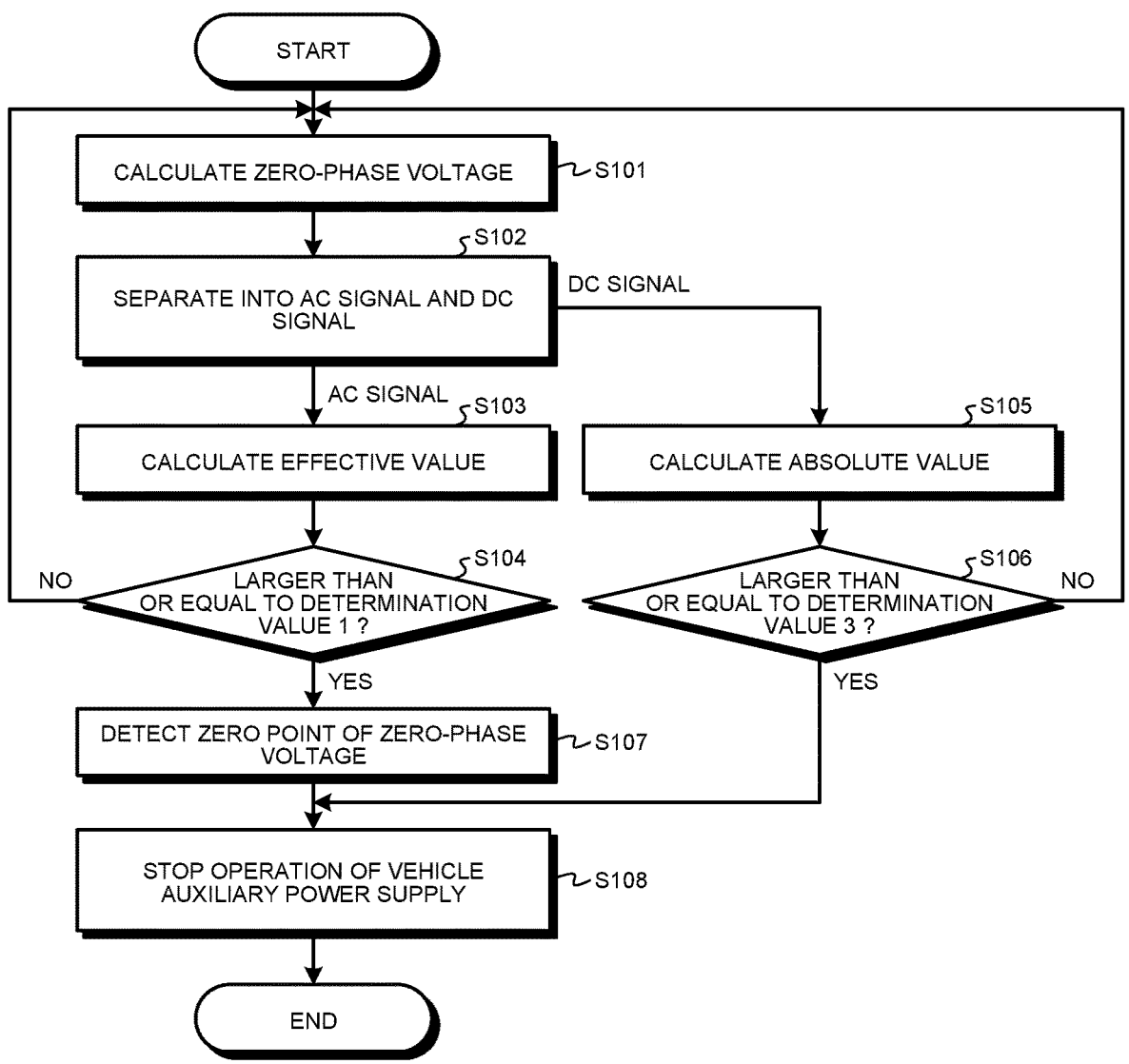
FIG. 10 is a flowchart illustrating a flow of a process by the control device in the present embodiment.

FIG. 8 and FIG. 9 are examples of a case when the functions of the zero-phase voltage calculation unit 121 and the ground fault detection unit 122 illustrated in FIG. 7 are implemented by a control circuit; however, the present embodiment is not limited to these examples. The function of the control device 12 according to the present embodiment can be represented in the form of a flowchart. FIG. 10 is a flowchart illustrating a flow of a process by the control device 12 in the present embodiment.

The control device 12 calculates a zero-phase voltage (step S101). The control device 12 separates the zero-phase voltage into an AC signal that is a signal train of the AC component and a DC signal that is a signal train of the DC component by using calculation data of the zero-phase voltage for at least one or more periods (step S102). The AC signal is used in the process in step S103 and the subsequent steps and the DC signal is used in the process in step S105 and the subsequent steps. These processes are performed concurrently under the control of the control device 12.

Process for AC Signal

The control device 12 calculates the effective value of the AC signal (step S103). The control device 12 compares the effective value calculated in step S103 with the determination value 1 (step S104). When the effective value is smaller than the determination value 1 (No in step S104), the process returns to step S101. Thereafter, the process from step S101 is repeated. When the effective value is larger than or equal to the determination value 1 (Yes in step S104), the control device 12 detects a zero point of the zero-phase voltage (step S107). Then, the control device 12 stops the operation of the vehicle auxiliary power supply 100 at the timing when the zero point of the zero-phase voltage is detected (step S108) and ends the process flow in FIG. 10.

In the process in step S104 described above, "Yes" is determined when the effective value is equal to the determination value 1, but "No" may be determined in such a case. That is, either "Yes" or "No" may be determined when the effective value is equal to the determination value 1.

Process for DC Signal

The control device 12 calculates the absolute value of the DC signal (step S105). The control device 12 compares the absolute value calculated in step S105 with the determination value 3 (step S106). When the absolute value is smaller than the determination value 3 (No in step S106), the process returns to step S101. Thereafter, the process from step S101 is repeated. When the absolute value is larger than or equal to the determination value 3 (Yes in step S106), the control device 12 immediately stops the operation of the vehicle auxiliary power supply 100 (step S108) and ends the process flow in FIG. 10. In the case of the DC signal, a voltage zero point is not generated. Thus, the operation of the vehicle auxiliary power supply 100 is immediately stopped unlike the process in the case of the AC signal.

In the process in step S106 described above, "Yes" is determined when the absolute value is equal to the determination value 3, but "No" may be determined in such a case. That is, either "Yes" or "No" may be determined when the absolute value is equal to the determination value 3.

In the following descriptions, in some cases, the process in step S101 is referred to as "calculation step" and the process in step S102 is referred to as "separation step". Moreover, in some cases, the process in step S104 is referred to as "first determination step" and the process in step S106 is referred to as "second determination step". Moreover, in some cases, the process in step S107 is referred to as "zero point detection step" and the process in step S108 is referred to as "stopping step".

Figure 11:
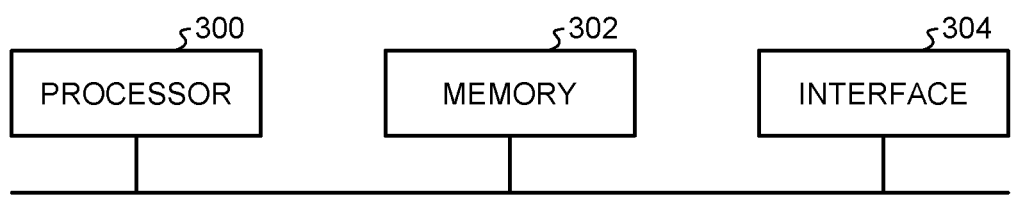
FIG. 11 is a block diagram illustrating an example of a hardware configuration when the function of the control device according to the present embodiment is implemented by software.
Figure 12:
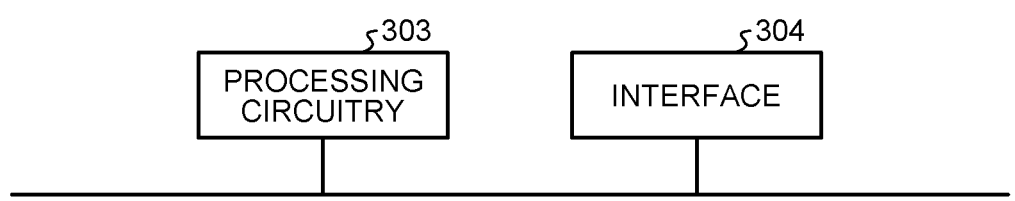
FIG. 12 is a block diagram illustrating another example of a hardware configuration when the function of the control device according to the present embodiment is implemented by software.

Next, a description will be given of a hardware configuration for implementing the function of the control device 12 according to the present embodiment by software with reference to FIG. 11 and FIG. 12. FIG. 11 is a block diagram illustrating an example of a hardware configuration when the function of the control device 12 according to the present embodiment is implemented by software. FIG. 12 is a block diagram illustrating another example of a hardware configuration when the function of the control device 12 according to the present embodiment is implemented by software.

In the case where the functions of the zero-phase voltage calculation unit 121 and the ground fault detection unit 122 in the control device 12 described above are implemented by software, as illustrated in FIG. 11, the configuration may be such that a processor 300 that performs an arithmetic operation, a memory 302 that saves programs to be read by the processor 300, and an interface 304 that inputs and outputs signals are included.

The processor 300 may be arithmetic means such as an arithmetic unit, a microprocessor, a microcomputer, a central processing unit (CPU), or a digital signal processor (DSP). The memory 302 can be exemplified by a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, and a digital versatile disc (DVD).

The memory 302 stores a program for implementing the functions of the zero-phase voltage calculation unit 121 and the ground fault detection unit 122. The processor 300 exchanges necessary information via the interface 304 and executes the program stored in the memory 302, thereby enabling the functions of the zero-phase voltage calculation unit 121 and the ground fault detection unit 122 described above to be executed.

The processor 300 and the memory 302 illustrated in FIG. 11 may be replaced by processing circuitry 303 as illustrated in FIG. 12. The processing circuitry 303 corresponds to a single circuit, a composite circuit, an application specific integrated circuit (ASIC), a field-programmable gate array (FPGA), or a combination thereof.

As described above, according to the present embodiment, the control device calculates a zero-phase voltage obtained by adding together three-phase voltages that are voltages at respective connection points between the three-phase reactor circuit and the three-phase capacitor circuit. The control device then separates the instantaneous value of the zero-phase voltage calculated into an AC signal and a DC signal and determines whether a ground fault has occurred on the basis of the effective value of the AC signal separated. The ground fault current flowing in the auxiliary load circuit when insulation deterioration has occurred is small. Thus, with the method of directly detecting the ground fault current, it is difficult to detect whether a ground fault has occurred with high accuracy. In contrast, the present embodiment applies a method in which three-phase voltages are used that are voltages at respective connection points between the three-phase reactor circuit and the three-phase capacitor circuit. With this method, the accuracy of detecting a ground fault can be improved compared with the method of directly detecting the ground fault current. Therefore, insulation deterioration of the auxiliary load circuit can be detected with high accuracy.

Moreover, according to the present embodiment, the control device determines whether a ground fault has occurred by using a determination logic different from overcurrent protection. Thus, it is possible to use a determination value different from overcurrent protection and specialized for the determination of whether a ground fault has occurred. Therefore, insulation deterioration of the auxiliary load circuit can be detected early.

Moreover, according to the present embodiment, the control device detects a zero point of the zero-phase voltage on the basis of the instantaneous value of the zero-phase voltage. When an AC ground fault is detected, the control device performs control of stopping the operation of the three-phase inverter at the timing when the zero point of the zero-phase voltage is detected. With this control, the residual voltage of the three-phase capacitor circuit can be controlled such that it becomes a value close to zero. Therefore, the adverse effect on the operation of the auxiliary load when the vehicle auxiliary power supply is restarted can be reduced.

The configurations described in the above-mentioned embodiments are merely examples of the content of the present invention. These configurations can be combined with another known technology, and moreover, a part of such configurations can be omitted and/or modified without departing from the scope of the present invention.

For example, FIG. 1 illustrates the exemplary configuration in which the connection point 7 of the three-phase capacitor circuit 22 is grounded via the ground resistor 6; however, the present embodiment is not limited to this configuration. If the resistance value of the electrical wires for grounding the connection point 7 satisfies the electrical equipment technical standards, the connection point 7 may be grounded without passing through the ground resistor 6.

Moreover, although FIG. 1 illustrates the example configuration in which the three capacitor elements of the three-phase capacitor circuit 22 are star-connected, the present embodiment is not limited to this configuration. The three capacitor elements may be delta-connected. When the three capacitor elements are delta-connected, the typical configuration is such that the three-phase inverter 10 and the three-phase capacitor circuit 22 are connected via a Δ-Y transformer. In the case of this configuration, the midpoint of the secondary-side coil of a transformer (not illustrated) is grounded. Therefore, the voltage of the midpoint of the secondary-side coil can be detected and the method according to the present embodiment described above can be applied.

Reference Signs List 1 power conversion apparatus; 2 filter circuit; 4 auxiliary load; 4A AC load; 4B DC load; 5 electrical wire; 6 ground resistor; 7, 8a, 8b, 8c connection point; 9 rectifier; 10 three-phase inverter; 11 voltage detector; 12 control device; 21 three-phase reactor circuit; 22 three-phase capacitor circuit; 30 DC overhead line; 30A AC overhead line; 31, 31A current collector; 41, 52 transformer; 42, 61 single-phase converter; 50 single-phase inverter; 100 vehicle auxiliary power supply; 121 zero-phase voltage calculation unit; 121a adder; 122 ground fault detection unit; 122a AC/DC separation unit; 122b effective value calculation unit; 122c absolute value calculation unit; 122d, 122e, 122g comparator; 122f AND operation unit; 122h OR operation unit; 300 processor; 302 memory; 303 processing circuitry; 304 interface.

The invention claimed is:

1. A power conversion apparatus comprising:
a three-phase inverter to convert input power to alternating-current power and supply the alternating-current power obtained by conversion to a load via a filter circuit comprising a three-phase reactor circuit and a three-phase capacitor circuit;
a voltage detector to detect three-phase voltages that are voltages at respective connection points between the three-phase reactor circuit and the three-phase capacitor circuit; and
a control device to control operation of the three-phase inverter on a basis of the three-phase voltages detected by the voltage detector, wherein
the control device comprises
calculation circuitry to calculate a zero-phase voltage obtained by adding together the three-phase voltages,
separation circuitry to separate an instantaneous value of the zero-phase voltage into an alternating-current signal and a direct-current signal, and
first determination circuitry to determine whether a ground fault occurs on a basis of an effective value of the alternating-current signal.

2. The power conversion apparatus according to claim 1, comprising second determination circuitry to determine whether a ground fault occurs on a basis of the direct-current signal.

3. The power conversion apparatus according to claim 2, wherein
the load is an alternating-current load to operate upon receiving supply of alternating-current power and a direct-current load to operate upon receiving supply of direct-current power,
the first determination circuitry determines whether an alternating-current ground fault that possibly occurs on a power supply path to the alternating-current load occurs, and
the second determination circuitry determines whether a direct-current ground fault that possibly occurs on a power supply path to the direct-current load occurs.

4. The power conversion apparatus according to claim 3, wherein
the control device includes zero-point detection circuitry to detect a zero point of the zero-phase voltage on a basis of the instantaneous value of the zero-phase voltage, and
when the first determination circuitry determines that the ground fault occurs, the control device stops operation of the three-phase inverter at a timing when the zero point is detected by the zero-point detection circuitry.

5. A vehicle auxiliary power supply comprising:
the power conversion apparatus according to claim 4; and
the filter circuit, wherein
the vehicle auxiliary power supply is mounted on a railroad vehicle, and uses direct-current power or alternating-current power supplied from an overhead line to supply the alternating-current power to an auxiliary load that is the load other than a main motor.

6. A vehicle auxiliary power supply comprising:
the power conversion apparatus according to claim 3; and
the filter circuit, wherein
the vehicle auxiliary power supply is mounted on a railroad vehicle, and uses direct-current power or alternating-current power supplied from an overhead line to supply the alternating-current power to an auxiliary load that is the load other than a main motor.

7. The power conversion apparatus according to claim 2, wherein
the control device includes zero-point detection circuitry to detect a zero point of the zero-phase voltage on a basis of the instantaneous value of the zero-phase voltage, and
when the first determination circuitry determines that the ground fault occurs, the control device stops operation of the three-phase inverter at a timing when the zero point is detected by the zero-point detection circuitry.

8. A vehicle auxiliary power supply comprising:
the power conversion apparatus according to claim 7; and
the filter circuit, wherein
the vehicle auxiliary power supply is mounted on a railroad vehicle, and uses direct-current power or alternating-current power supplied from an overhead line to supply the alternating-current power to an auxiliary load that is the load other than a main motor.

9. A vehicle auxiliary power supply comprising:
the power conversion apparatus according to claim 2; and
the filter circuit, wherein
the vehicle auxiliary power supply is mounted on a railroad vehicle, and uses direct-current power or alternating-current power supplied from an overhead line to supply the alternating-current power to an auxiliary load that is the load other than a main motor.

10. The power conversion apparatus according to claim 1, wherein
the control device includes zero-point detection circuitry to detect a zero point of the zero-phase voltage on a basis of the instantaneous value of the zero-phase voltage, and
when the first determination circuitry determines that the ground fault occurs, the control device stops operation of the three-phase inverter at a timing when the zero point is detected by the zero-point detection circuitry.

11. A vehicle auxiliary power supply comprising:
the power conversion apparatus according to claim 10; and
the filter circuit, wherein
the vehicle auxiliary power supply is mounted on a railroad vehicle, and uses direct-current power or alternating-current power supplied from an overhead line to supply the alternating-current power to an auxiliary load that is the load other than a main motor.

12. A vehicle auxiliary power supply comprising:
the power conversion apparatus according to claim 1; and
the filter circuit, wherein
the vehicle auxiliary power supply is mounted on a railroad vehicle, and uses direct-current power or alternating-current power supplied from an overhead line to supply the alternating-current power to an auxiliary load that is the load other than a main motor.

13. A method for stopping a power conversion apparatus comprising a three-phase inverter to convert input power to alternating-current power and supply the alternating-current power obtained by conversion to a load via a filter circuit comprising a three-phase reactor circuit and a three-phase capacitor circuit, and a voltage detector to detect three-phase voltages that are voltages at respective connection points between the three-phase reactor circuit and the three-phase capacitor circuit, the method comprising:
- a calculation of calculating a zero-phase voltage obtained by adding together the three-phase voltages;
- a separation of separating an instantaneous value of the zero-phase voltage into an alternating-current signal and a direct-current signal;
- a first determination of determining whether a ground fault occurs on a basis of an effective value of the alternating-current signal;
- a zero-point detection of detecting a zero point of the zero-phase voltage on a basis of an instantaneous value of the zero-phase voltage; and
- stopping, when it is determined in the first determination that a ground fault occurs, operation of the three-phase inverter at a timing when the zero point is detected in the zero-point detection.

14. The method for stopping the power conversion apparatus according to claim 13, further comprising
- a second determination of determining whether a ground fault occurs on a basis of an absolute value of the direct-current signal, wherein
- when it is determined in the second determination that a ground fault occurs, the stopping includes performing a process of stopping operation of the three-phase inverter regardless of whether the zero point is detected in the zero-point detection.

* * * * *